United States Patent [19]

Dzieduszko

[11] Patent Number: 5,309,475
[45] Date of Patent: May 3, 1994

[54] DATA INTERCHANGE NETWORK

[75] Inventor: Janusz W. Dzieduszko, Coral Springs, Fla.

[73] Assignee: ABB Power T&D Company Inc., Blue Bell, Pa.

[21] Appl. No.: 770,971

[22] Filed: Oct. 1, 1991

[51] Int. Cl.⁵ ............................................. H04B 7/17
[52] U.S. Cl. ................................. 375/3; 375/7; 359/166; 359/174
[58] Field of Search ............... 375/3, 22, 7; 359/152, 359/153, 154, 161, 164, 165, 166, 174, 175, 177, 184

[56] References Cited

U.S. PATENT DOCUMENTS

| | | | |
|---|---|---|---|
| 4,001,578 | 1/1977 | Cook et al. | 250/199 |
| 4,347,617 | 8/1982 | Murano et al. | 375/22 |
| 4,397,042 | 8/1983 | Tsujii et al. | 455/608 |
| 4,584,719 | 4/1986 | Miller | 455/608 |
| 4,654,844 | 3/1987 | Mandello | 370/32 |
| 4,663,767 | 5/1987 | Bodlaj et al. | 375/55 |
| 4,694,504 | 9/1987 | Porter et al. | 455/608 |
| 4,698,826 | 10/1987 | Denhez et al. | 375/3 |
| 4,731,880 | 3/1988 | Ault et al. | 455/607 |
| 4,843,382 | 6/1989 | Oda et al. | 359/166 |
| 4,849,969 | 7/1989 | Annamalai | 370/100 |
| 4,955,081 | 9/1990 | Takahashi | 455/608 |
| 5,083,874 | 1/1992 | Aida et al. | 359/154 |
| 5,097,353 | 3/1992 | Fujiwara et al. | 375/3 |

*Primary Examiner*—Curtis Kuntz
*Assistant Examiner*—Don N. Vo
*Attorney, Agent, or Firm*—Woodcock Washburn Kurtz Mackiewicz & Norris

[57] ABSTRACT

A fiber optic data interchange network comprising a plurality of nodes, or drops 10a, 10b, 10c . . . , interconnected by fiber optic cable 12 (FIG. 1). Encoded data signals originating at any node are circulated around the network, allowing multipoint (or multidrop) data interchange. Each node includes a data encoder, transmitter, fiber optic receiver, data decoder, clock recovery circuit, and a repeater, i.e., a combination of the fiber optic receiver, an invertor (providing pulse width distortion correction) and the fiber optic transmitter. Thus each node is capable of originating data transmissions and receiving/relaying transmissions from a preceding node.

19 Claims, 3 Drawing Sheets

DATA INTERCHANGE NETWORK

FIELD OF THE INVENTION

The present invention generally relates to the field of digital communication networks, and more particularly relates to (but is not limited to) an asynchronous optical fiber data interchange network. Still more particularly, the present invention relates to a repeater for use in an asynchronous optical fiber data interchange network.

BACKGROUND OF THE INVENTION

A modern day data communication system is typically a network of processors and peripherals interconnected to move data between sources and users spread over a large geographical area. The architecture of a typical data network may involve many design tradeoffs that are specific to the intended application of the network, but the complete description of the network will include specifications of the network topology, communication protocols, hardware and transmission media and links.

The topology of a network is a pattern or diagram of its interconnectivity. The earliest computer time-sharing networks were connected in a simple star configuration, which is appropriate when the terminals communicate only with the central computer. More complex configurations, such as meshes of trees, may be appropriate for applications in which terminals and processors communicate with each other. The ring topology is a common configuration used in many local-area networks.

Available transmission media include air (e.g., in terrestrial line-of-sight microwave or satellite systems), coaxial cable, paired copper cable and fiber optic cable. Many different systems having different band widths, modulation techniques, frequency bands, etc., have been developed for each type of transmission medium. The best combination of characteristics for a particular system would depend upon the intended application and environment of that system. In many environments, e.g., in an electrical substation, reliability and cost are the paramount concerns; i.e., the network should be highly reliable and yet be reasonably inexpensive.

SUMMARY OF THE INVENTION

Accordingly, one important object of the present invention is to provide a highly reliable yet inexpensive data interchange network. A further object of the invention is to provide means by which a network node may receive information from a preceding node and relay that information to a subsequent node. A still further object of the invention is to provide a simple, inexpensive means for reducing pulse width distortion introduced by the components of the respective network nodes. Those goals have been achieved by the present invention, preferred embodiments of which combine known, reliable technology (e.g., fiber optic technology) with novel yet simple (and correspondingly reliable) electronic circuitry.

One aspect of the present invention encompasses apparatus, herein referred to as nodes or drops, for use in a data interchange network. A node in accordance with the present invention is capable of originally transmitting, receiving and relaying (i.e., receiving and re-transmitting) encoded data signals in a data interchange network. Such apparatus comprise: (a) receiver means for receiving a first encoded data signal and providing an output signal (RX); (b) clock recovery means for recovering a clock signal (RC) from the output signal RX; (c) data decoder means for providing a received data signal (RD) on the basis of the output signal RX and the clock signal RC; (d) pulse width distortion (PWD) correction means for at least partially correcting for any pulse width distortion in the output signal RX and providing a PWD-corrected signal; (e) encoder means for providing a transmit data signal (XD) on the basis of data to be transmitted (TD) and a transmit data clock signal (XC); (f) transmitter means for transmitting a second encoded data signal on the basis of an input signal; and (g) select means for selectively providing one of either the PWD-corrected signal or the transmit data signal XD as the input signal to the transmitter means.

In one preferred embodiment of the present invention the receiver means comprises a fiber optic receiver and the transmitter means comprises a fiber optic transmitter.

The data decoder means may comprise a Nonreturn to Zero Differential (NRZD) decoder (of course the type of decoder employed should match the type of encoder employed). A preferred embodiment of an NRZD decoder comprises first and second type D flip-flops and an EXOR gate. The first type D flip-flop has a data input terminal (D1) coupled to the receiver means, a clock input terminal (CLK1) coupled to the clock recovery means and an output terminal (Q1). The second type D flip-flop has a data input terminal (D2) coupled to the output terminal Q1 of the first flip-flop, a clock input terminal (CLK2) coupled to the clock recovery means and an output terminal (Q2). The EXOR gate has first and second input terminals coupled to the respective output terminals Q1, Q2 of the first and second flip-flops and an output terminal. The received data signal RD is provided via the output terminal of the EXOR gate.

The clock recovery means in another preferred embodiment comprises first and second type D flip-flops, an inverted EXOR gate and divider means. The first type D flip-flop has a data input terminal (D1) coupled to the receiver means, a clock input terminal (CLK1) adapted to receive a clock signal X16 and an output terminal (Q1). The second type D flip-flop has a data input terminal (D2) coupled to the output terminal Q1 of the first flip-flop, a clock input terminal (CLK2) adapted to receive the clock signal X16 and an output terminal (Q2). The inverted EXOR gate has first and second input terminals coupled to the respective output terminals Q1, Q2 of the first and second flip-flops and an output terminal. The divider means provides the clock signal RC on the basis of the clock signal X16 and an output of the inverted EXOR gate.

The encoding method employed should be polarity insensitive; thus, e.g., Nonreturn to Zero Differential encoding or Biphase-mark encoding may be used. A preferred NRZD encoder comprises first and second type D flip-flops and an EXOR gate. The first type D flip-flop has a data input terminal (D1) adapted to accept the data to be transmitted TD, a clock input terminal (CLKI) adapted to accept the transmit data clock signal XC and an output terminal (Q1). The EXOR gate has a first input terminal coupled to the output terminal Q1 of the first flip-flop, a second input terminal and an output terminal. The second type D flip-flop has a data input terminal (D2) coupled to the output terminal of the EXOR gate, a clock input terminal (CLK2) adapted to accept the transmit data clock signal XC and an output terminal (Q2) coupled to the second input terminal of the EXOR gate.

The present invention also encompasses data interchange networks comprising: a plurality of nodes or drops each of which is capable of receiving, re-transmitting and originally transmitting encoded data signals via fiber optic cable, and a plurality of cables interconnecting the nodes or drops. Each of the nodes or drops comprises receiver means, clock recovery means, data decoder means, PWD correction means, encoder means, transmitter means, and select means.

The present invention further encompasses repeaters for use in a data interchange network comprising a receiver adapted to receive a first encoded data signal and provide a received output signal (RX), an invertor for inverting the received output signal RX, and a transmitter for transmitting the received output signal RX after inversion by the invertor.

Methods of exchanging data in accordance with the present invention comprise the steps of: (a) transmitting a first encoded optical data signal from a first node; (b) receiving the first encoded optical data signal at a second node and providing at the second node an electrical output signal (RX) based upon the first encoded optical data signal; (c) recovering a clock signal (RC) from the electrical output signal RX; (d) providing a received data signal (RD), on the basis of the electrical output signal RX and the clock signal RC, indicative of data encoded in the encoded optical data signal; (e) at least partially correcting for any pulse width distortion in the electrical output signal RX and providing a PWD-corrected signal; (f) generating a transmit data signal (XD) on the basis of data to be transmitted (TD) and a transmit data clock signal (XC); (g) selecting one of either the PWD-corrected signal or the transmit data signal XD; and (h) transmitting, from the second node to a third node, a second encoded optical data signal based upon the selected signal.

Other features of the invention are described below in connection with a detailed description of specific preferred embodiments.

DETAILED DESCRIPTION OF PREFERRED EMBODIMENTS

Figure 1:
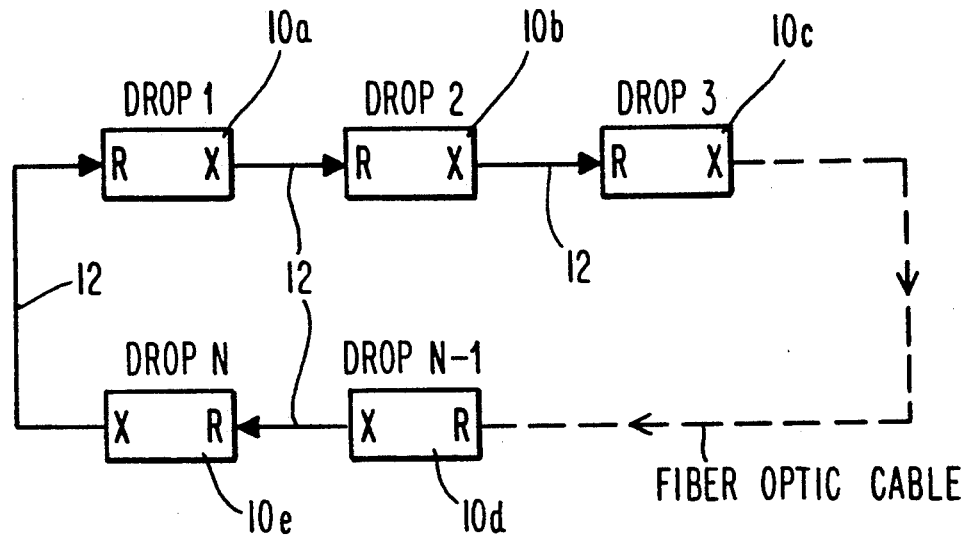
FIG. 1 is a block diagram of a fiber optic data interchange network in accordance with the present invention.

Referring to FIG. 1, a fiber optic data interchange network in accordance with the present invention comprises a plurality of nodes, or drops, 10a, 10b, 10c . . . , interconnected as shown by fiber optic cables 12.

Each node or drop in the network of FIG. 1 is connected to its immediate neighbors by unidirectional lines (as indicated by the arrows on the fiber optic cables). In accordance with the invention, encoded data signals originating at any node 10a, 10b, 10c, etc. are circulated around the network, thus allowing multipoint (or multidrop) data interchange. Each node or drop includes a data encoder, transmitter, receiver, data decoder and clock recovery circuit so that the node is capable of originally transmitting and receiving encoded data signals, and a repeater. A preferred embodiment of a repeater includes a combination of a fiber optic receiver, a device providing pulse width distortion correction, and the fiber optic transmitter. Thus each node is capable of originating data transmissions and receiving/relaying transmissions from a preceding node. Each of the components just mentioned will now be described.

Figure 2:
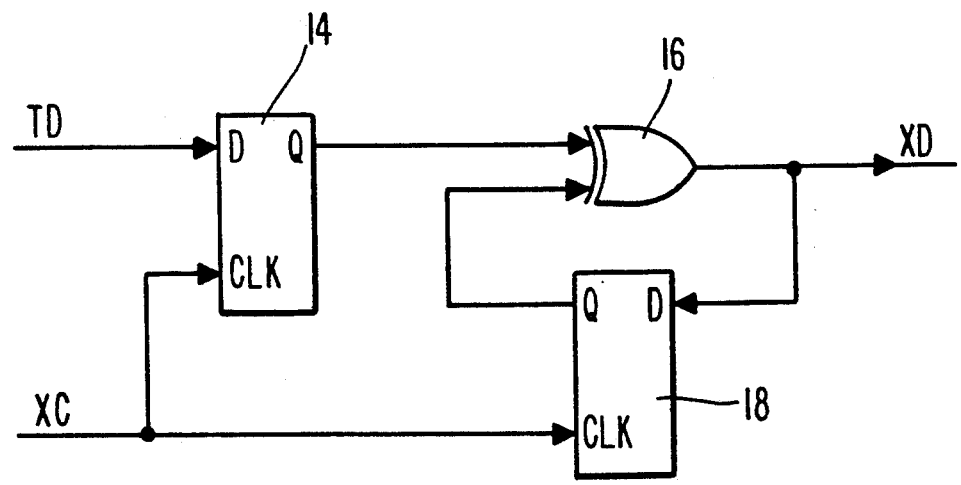
FIG. 2 is a schematic diagram of an NRZD encoder in accordance with the present invention.

FIG. 2 depicts one preferred embodiment of a data encoder circuit in accordance with the present invention, in particular, a Nonreturn to Zero Differential (NRZD) encoder. In this example the data message is assumed to contain a logical "1" start bit or bits. The stop bits(s) may be either logical "1" or "0". A binary "1" is represented by a transition (high to low or low to high) at the beginning of the bit frame (i.e., time period needed to transmit that bit); a binary "0" is conveyed by the absence of a transition, i.e., the signal remains either high or low. In the circuit of FIG. 2, data to be transmitted TD is input to the "D" terminal of a first flip-flop 14 (e.g., a 74LS74 (TTL) or 74HC74 (CMOS) type D flip-flop) and a transmit data clock signal XC is input to the "CLK" input. (The transmit data clock signal XC is generated at each node by that node's transmitter.) The "Q" output of flip-flop 14 is coupled to a first input terminal of EXOR gate 16 (e.g., a 74LS86 or 74HC86 EXOR gate). The "D" input of a second flip-flop 18 is coupled to the output terminal of EXOR gate 16; the "CLK" input of flip-flop 18 receives the transmit data clock signal XC and the "Q" output terminal is coupled to a second input terminal of EXOR gate 16. The NRZD-encoded data signal XD appears at the output terminal of the EXOR gate in accordance with the following truth table:

| TD | XC | XD |
| --- | --- | --- |
| "0" | ⎍ | "0"* |
| "0" | ⎍ | "0" |
| "1" | ⎍ | "1" |
| "1" | ⎍ | "0" |

(*This assumes a previous "0" state of XD.)

Figure 3:
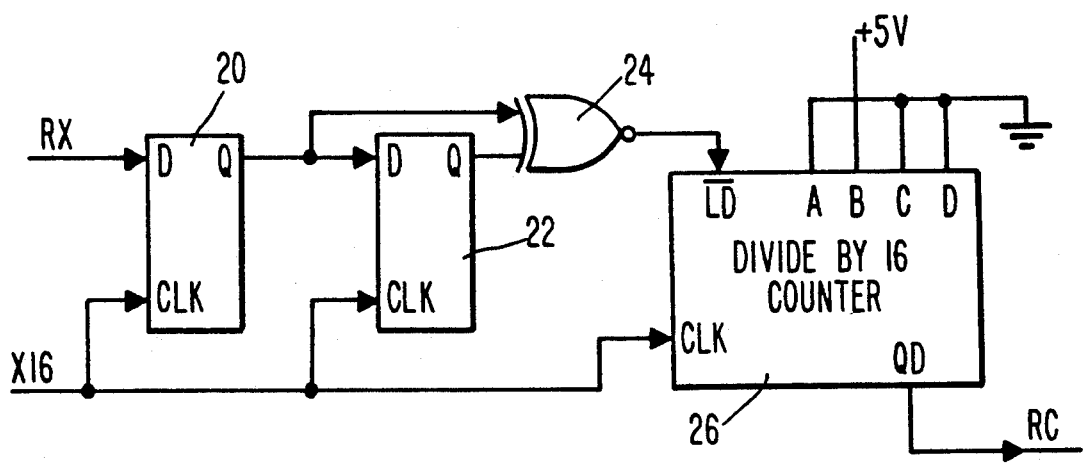
FIG. 3 is a schematic diagram of a clock recovery circuit in accordance with the present invention.

FIG. 3 depicts a preferred embodiment of a conventional clock recovery circuit that may be used in practicing the present invention. This circuit takes a received data signal RX (provided by its associated fiber optic receiver) in combination with a clock signal X16 generated by the receiver at a prescribed rate and produces a received data clock signal RC. It should be noted that X16 is a free running signal generated by each receiver at a rate sixteen times the prescribed transmission rate. The received data clock signal RC is used as a timing signal by the decoder circuit of FIG. 4, as described below. The clock recovery circuit of FIG. 3 includes a first flip-flop 20 that takes as input the received NRZD data signal RX at its D input terminal and the clock signal X16 at its CLK input terminal. The Q output terminal of flip-flop 20 is coupled to the D input terminal of a second flip-flop 22. The CLK input terminal of flip-flop 22 receives the clock signal X16. The respective Q output terminals of flip-flops 20 and 22 are coupled to the respective inputs of an inverted EXOR gate 24, and the output terminal of gate 24 is coupled to the LD input terminal of a divide by sixteen counter 26 (e.g., a 74LS161 or 74HC161 counter). Counter 26 also receives the clock signal X16 at its clock input terminal "CLK" and provides on its output terminal "QD" the received data clock signal RC. It should be noted that other phase-locked loop techniques may be employed as alternatives to the circuit of FIG. 3.

Figure 4:
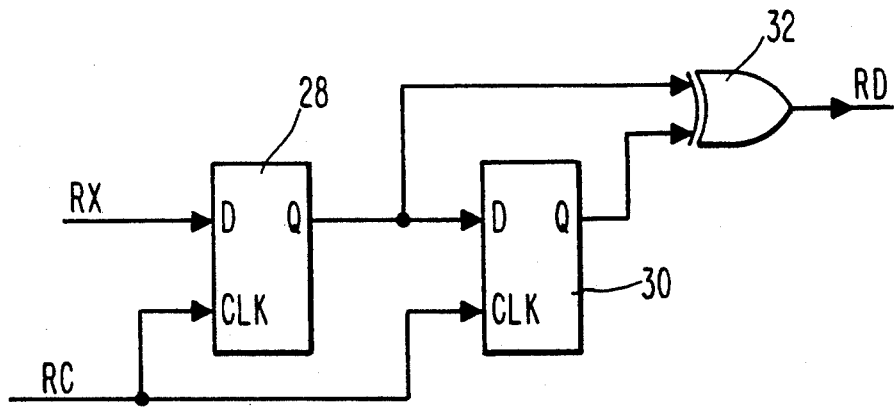
FIG. 4 is a schematic diagram of an NRZD decoder in accordance with the present invention.

FIG. 4 depicts a preferred embodiment of an NRZD data decoder circuit that may be employed in practicing the present invention. That circuit takes the received data signal RX at the "D" terminal of a first flip-flop 28 and the received data clock signal RC at the "CLK" input terminal of flip-flop 28. The "Q" output terminal of flip-flop 28 is coupled to the "D" input terminal of a second flip-flop 30 while the "CLK" input of flip-flop 30 receives the received data clock signal RC. The respective "Q" output terminals of flip-flops 28 and 30 are coupled to the input terminals of an EXOR gate 32. A received data signal RD is output on the output terminal of the EXOR gate in accordance with the following truth table:

| RX | RC | RD |
|----|----|----|
| "0" | ⎍ | "0"* |
| "0" | ⎍ | "0" |
| "1" | ⎍ | "1" |
| "0" | ⎍ | "1" |

(*This assumes a previous "0" state of RX.)

Figure 5:
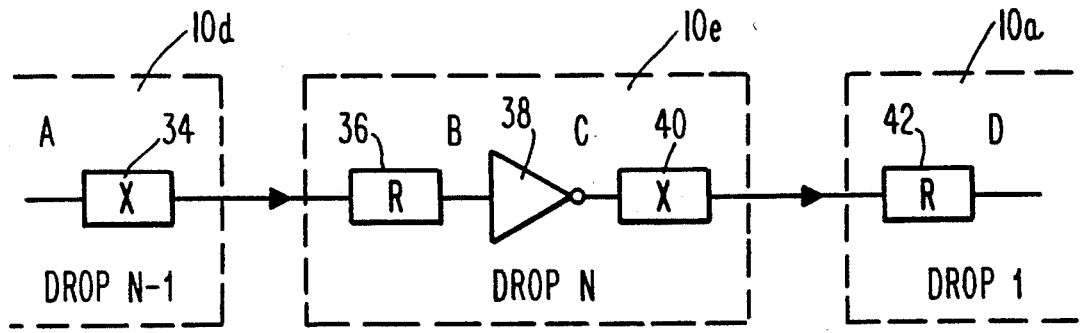
FIG. 5 is a partial schematic diagram of one embodiment of a fiber optic data interchange network with pulse width distortion correction means in accordance with the present invention.
Figure 6:
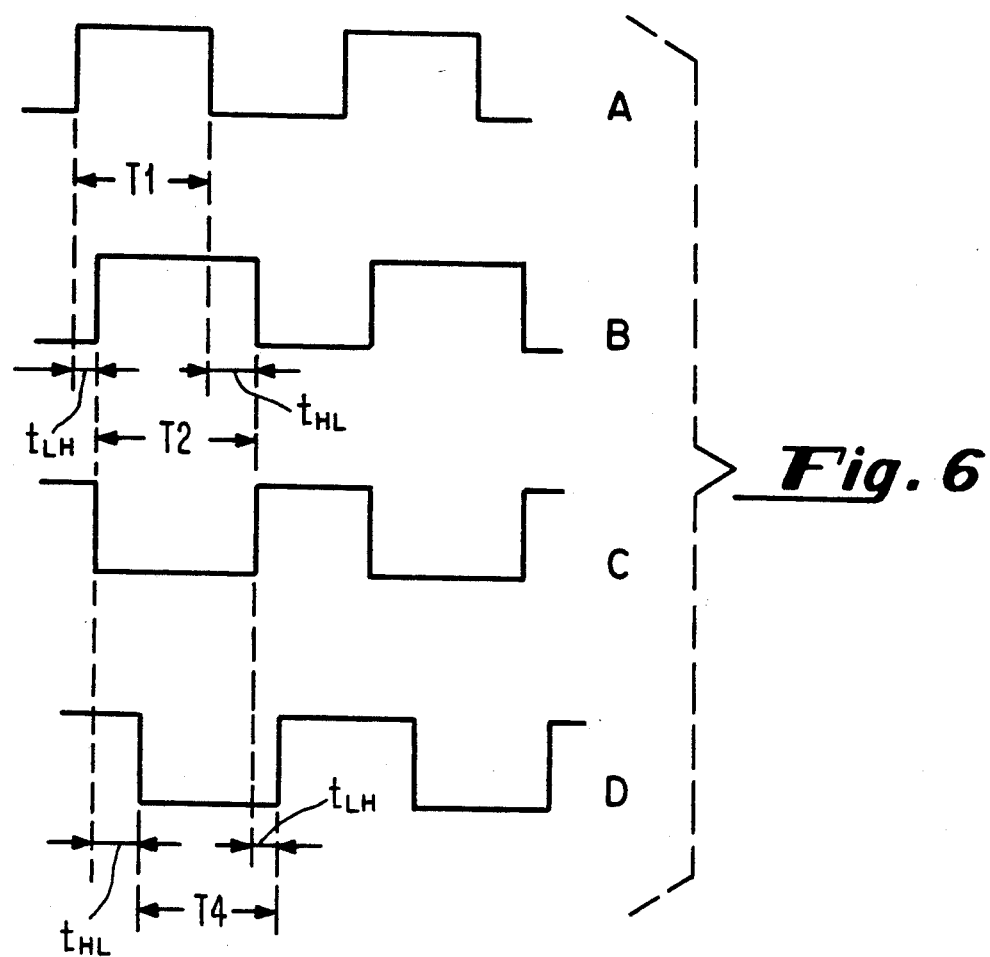
FIG. 6 is a timing diagram used to explain the operation of the pulse width distortion correction means.

Pulse width distortion (PWD) is one of the factors limiting the maximum communication data rate of a data interchange network. PWD (as illustrated by A and B of FIG. 6) is caused by dissimilar propagation delays caused by the respective fiber optic receivers. Referring now to FIGS. 5 and 6, a repeater-with-invertor arrangement in accordance with the present invention provides for PWD correction as described below. The arrangement of FIG. 5 employs an inventor 38 between the receiver 36 and transmitter 40 of each node, e.g., node 10e (drop "N") in FIG. 5. Also shown in FIG. 5 are transmitter 34 of node 10d and receiver 42 of node 10a. The labels "A", "B", "C", and "D" of FIG. 5 indicate the locations at which the corresponding exemplary signals of FIG. 6 appear (those signals are also labelled "A", "B", "C", "D"). The arrangement of FIG. 5 produces the following relationships in the signals of FIG. 6:

$$t_{LH} < t_{HL}$$

$$T_2 > T_1$$

$$T_2 = T_1 + t_{HL} - t_{LH}$$

$$T_4 = T_2 + t_{LH} - t_{HL} = T_1 + t_{HL} - t_{LH} + t_{LH} - t_{HL}$$

$$T_4 = T_1$$

Thus, the original pulse width (or pulse duration) of signal "A" is restored in signal "D".

Figure 7:
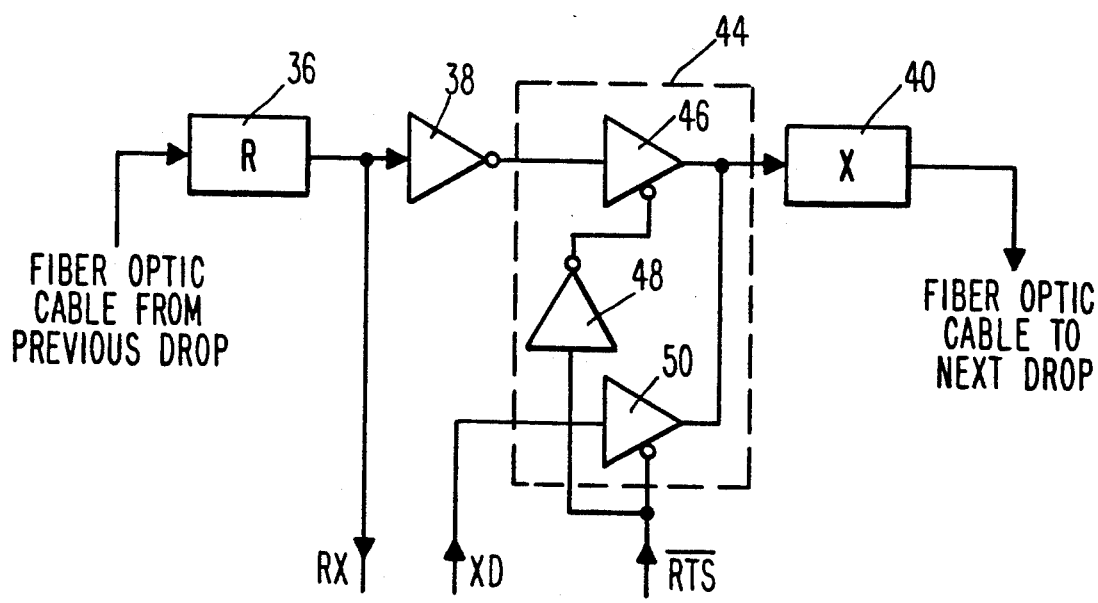
FIG. 7 is a partial schematic diagram of an embodiment of a fiber optic data interchange network with pulse width distortion correction means and interface to the local drop in accordance with the present invention.

FIG. 7 depicts a switching arrangement 44 whereby the input to a transmitter, e.g., the fiber optic transmitter 40 of node 10e, is switched between the output of the PWD correction invertor 38 and the output of the encoder (only the output signal XD of the encoder is shown in FIG. 8, not the encoder itself). The switching arrangement of FIG. 7 (which is only one example of many possible switching arrangements) includes an invertor 48 and two tristate-with-enable buffers 46, 50 (e.g., 74LS125 or 74HC125 buffers). The arrangement is controlled (switched) by a "request to send" signal RTS that is generated by the transmitter of each node (not shown).

Although the present invention is not limited to fiber optic networks, it should be noted that fiber optic elements (transmitters and receivers) have demonstrated that they are highly reliable, with MTBF figures in excess of $4 \times 10^6$ hours. That reliability makes the use of fiber optic networks preferable in environments where reliability is important (e.g., an electrical substation). A network of 25 drops, or 50 elements, should therefore exhibit an MTBF of $8 \times 10^4$ hours (9.13 years), or more. Network reliability may be further improved by providing a dual redundant configuration.

The foregoing specification of preferred embodiments is not intended to limit the scope of the present invention, as the invention may be practiced in alternative embodiments. For example, a popular digital communication channel arrangement, known as the T1 multiplexing system, requires that each of several 64 kbps communication subchannels operate synchronously with the T1 based clock. The most obvious (and most expensive) method of clock synchronization is to dedicate a communication channel for a clock signal. In the context of the present invention, however, the T1 clock may be encoded into and recovered from the data stream by using Biphase-mark encoding. The Biphase-mark encoding method, which like the NRZD method is polarity insensitive, is based upon the following rules:
(1) There is a transition (positive or negative) at the beginning of every bit frame.
(2) There is a transition (positive or negative) in the middle of a bit frame when "1" is transmitted.
(3) There is no transition in the bit frame when "0" is transmitted.

The clock signal can therefore be recovered from the received data by using well known techniques. Therefore, the above-described NRZD encoders and decoders may (and perhaps should) be replaced with Biphase-mark encoders and decoders in situations where highly precise receiver/decoder timing is critical. The main advantage of the Biphase method in those situations is that it produces a transition for every bit frame, which facilitates greater timing precision.

In addition, the present invention is not limited to optical data interchange networks, since it is apparent that the most advantageous type of transmission will depend upon the particular application; e.g., in some applications electrical or microwave transmission may be preferable for one reason or another. Moreover, it should especially be noted that the invention is not limited to the particular circuits specified above for the encoder, decoder, clock recovery circuit, etc., since a person skilled in the art will readily appreciate that equivalents of those circuits may be devised without undue effort. Other modifications and variations of the embodiments specified above will fall within the true scope of the invention as set forth in the following claims.

What is claimed is:

1. A drop or node for use in a data interchange network, comprising:
   (a) receiver means for receiving a first encoded data signal and providing an output signal (RX);
   (b) clock recovery means, coupled to said receiver means, for recovering a clock signal (RC) from said output signal RX;
   (c) data decoder means, coupled to said receiver means and said clock recovery means, for providing a received data signal (RD) on the basis of said output signal RX and said clock signal RC, said received data signal RD indicative of data encoded in said encoded data signal;
   (d) pulse width distortion (PWD) correction means, coupled to said receiver means, for at least partially correcting for any pulse width distortion in said output signal RX and providing a PWD-corrected signal;
   (e) encoder means for providing a transmit data signal (XD) on the basis of data to be transmitted (TD) and an externally generated transmit data clock signal (XC);
   (f) transmitter means for transmitting a second encoded data signal on the basis of an input signal; and
   (g) select means, coupled between said encoder means, PWD correction means and transmitter means, for selectively providing one of either said PWD-corrected signal or said transmit data signal XD as said input signal to said transmitter means.

2. A drop or node as recited in claim 1, wherein said receiver means comprises a fiber optic receiver and transmitter means comprises a fiber optic transmitter.

3. A drop or node as recited in claim 1, wherein said select means comprises
   a first tristate-with-enable buffer having an input terminal coupled to an output terminal of said PWD correction means, an output terminal coupled to an input terminal of said transmitter means, and an enable terminal;
   an invertor having an output terminal coupled to the enable terminal of said first tristate-with-enable buffer and an input terminal adapted to receive an externally generated request to send signal; and
   a second tristate-with-enable buffer having an input terminal adapted to receive the transmit data signal XD, an output terminal coupled to the input terminal of said transmitter means, and an enable terminal adapted to receive said request to send signal.

4. A drop or node as recited in claim 1, wherein said data decoder means comprises:
   a first flip-flop having a data input terminal (D1) coupled to the receiver means, a clock input terminal (CLK1) coupled to the clock recovery means and an output terminal (Q1);
   a second flip-flop having a data input terminal (D2) coupled to the output terminal Q1 of the first flip-flop, a clock input terminal (CLK2) coupled to the clock recovery means and an output terminal (Q2); and
   an exclusive OR (EXOR) gate having first and second input terminals coupled to the respective output terminals Q1, Q2 of the first and second flip-flops and an output terminal, wherein the received data signal RD is provided via said output terminal.

5. A drop or node as recited in claim 1, wherein said clock recovery means comprises:
   a first flip-flop having a data input terminal (D1) coupled to the receiver means, a clock input terminal (CLK1) adapted to receive an externally generated clock signal X16 and an output terminal (Q1);
   a second flip-flop having a data input terminal (D2) coupled to the output terminal Q1 of the first flip-flop, a clock input terminal (CLK2) adapted to receive the clock signal X16 and an output terminal (Q2);
   an inverted exclusive OR (inverted EXOR) gate having first and second input terminals coupled to the respective output terminals Q1, Q2 of the first and second flip-flops and an output terminal; and
   divider means, coupled to the output terminal of the inverted EXOR gate and the respective clock input terminals CLK1, CLK2 of the first and second flip-flops, for providing the clock signal RC on the basis of the clock signal X16 and an output of the inverted EXOR gate.

6. A drop or node as recited in claim 1, wherein said encoder means comprises a Nonreturn to Zero Differential (NRZD) encoder.

7. A drop or node as recited in claim 1, wherein said encoder means comprises a Biphase-mark encoder.

8. A drop or node as recited in claim 6, wherein said NRZD encoder comprises:
   a first flip-flop having a data input terminal (D1) adapted to accept said data to be transmitted TD, a clock input terminal (CLK1) adapted to accept said transmit data clock signal XC and an output terminal (Q1);
   an exclusive OR (EXOR) gate having a first input terminal coupled to the output terminal Q1 of the first flip-flop, a second input terminal and an output terminal; and
   a second flip-flop having a data input terminal (D2) coupled to the output terminal of the EXOR gate, a clock input terminal (CLK2) adapted to accept the transmit data clock signal XC and an output terminal (Q2) coupled to the second input terminal of the EXOR gate.

9. A drop or node as recited in claim 1, wherein:
   said data decoder means comprises:
   a first flip-flop having a data input terminal (D1) coupled to the receiver means, a clock input terminal (CLK1) coupled to the clock recovery means and an output terminal (Q1);
   a second flip-flop having a data input terminal (D2) coupled to the output terminal Q1 of the first flip-flop, a clock input terminal (CLK2) coupled to the clock recovery means and an output terminal (Q2); and a first exclusive OR (EXOR) gate having first and second input terminals coupled to the respective output terminals Q1, Q2 of the first and second flip-flops and an output terminal, wherein the received data signal RD is provided via said output terminal;

wherein said clock recovery means comprises:

a third flip-flop having a data input terminal (D3) coupled to the receiver means, a clock input terminal (CLK3) adapted to receive an externally generated clock signal X16 and an output terminal (Q3):

a fourth flip-flop having a data input terminal (D4) coupled to the output terminal Q3 of the third flip-flop, a clock input terminal (CLK4) adapted to receive the clock signal X16 and an output terminal (Q4);

an inverted exclusive or (inverted EXOR) gate having first and second input terminals coupled to the respective output terminals Q3, Q4 of the third and fourth flip-flops and an output terminal; and divider means, coupled to the output terminal of the inverted EXOR gate and the respective clock input terminals CLK3, CLK4 of the third and fourth flip-flops, for providing the clock signal RC on the basis of the clock signal X16 and an output of the inverted EXOR gate; and wherein said encoder means comprises:

a fifth flip-flop having a data input terminal (D5) adapted to accept said data to be transmitted TD, a clock input terminal (CLK5) adapted to accept said transmit data clock signal XC and an output terminal (Q5);

a second exclusive or (EXOR) gate having a first input terminal coupled to the output terminal Q5 of the fifth flip-flop, a second input terminal and an output terminal; and a sixth flip-flop having a data input terminal (D6) coupled to the output terminal of the second EXOR gate, a clock input terminal (CLK6) adapted to accept the transmit data clock signal XC and an output terminal (Q6) coupled to the second input terminal of the second EXOR gate.

10. A drop or node for receiving and re-transmitting, and for originally transmitting, encoded data signals in a fiber optic data interchange network, comprising:

(a) a fiber optic receiver adapted to receive a first encoded data signal and providing an output signal (RX);

(b) a clock recovery circuit recovering a clock signal (RC) from said output signal RX, comprising:

a first flip-flop having a data input terminal (D1) coupled to the fiber optic receiver, a clock input terminal (CLK1) adapted to receive an externally generated clock signal X16 and an output terminal (Q1);

a second flip-flop having a data input terminal (D2) coupled to the output terminal Q1 of the first flip-flop, a clock input terminal (CLK2) adapted to receive the clock signal X16 and an output terminal (Q2);

an inverted exclusive OR (inverted EXOR) gate having first and second input terminals coupled to the respective output terminals Q1, Q2 of the first and second flip-flops and an output terminal; and divider means, coupled to the output terminal of the inverted EXOR gate and the respective clock input terminals CLK1, CLK2 of the first and second flip-flops, for providing the clock signal RC on the basis of the clock signal X16 and an output of the inverted EXOR gate;

(c) a data decoder circuit providing a received data signal (RD) on the basis of said output signal RX and said clock signal RC, said received data signal RD being indicative of data encoded in said encoded data signal, said data decoder circuit comprising:

a third flip-flop having a data input terminal (D3) coupled to the fiber optic receiver, a clock input terminal (CLK3) coupled to the clock recovery circuit and an output terminal (Q3);

a fourth flip-flop having a data input terminal (D4) coupled to the output terminal Q3 of the third flip-flop, a clock input terminal (CLK4) coupled to the clock recovery circuit and an output terminal (Q4); and a first exclusive or (EXOR) gate having first and second input terminals coupled to the respective output terminals Q3, Q4 of the third and fourth flip-flops and an output terminal, wherein the received data signal RD is provided via said output terminal;

(d) pulse width distortion (PWD) correction means, coupled to said fiber optic receiver, for at least partially correcting for any pulse width distortion in said output signal RX and providing a PWD-corrected signal;

(e) an encoder circuit for providing a transmit data signal (XD) on the basis of data to be transmitted (TD) and the transmit data clock signal (XC), said encoder circuit comprising:

a fifth flip-flop having a data input terminal (D5) adapted to accept said data to be transmitted TD, a clock input terminal (CLK5) adapted to accept said transmit data clock signal XC and an output terminal (Q5);

a second exclusive or (EXOR) gate having a first input terminal coupled to the output terminal Q5 of the fifth flip-flop, a second input terminal and an output terminal; and a sixth flip-flop having a data input terminal (D6) coupled to the output terminal of the second EXOR gage, a clock input terminal (CLK6) adapted to accept the transmit data clock signal XC and an output terminal (Q6) coupled to the second input terminal of the second EXOR gate;

(f) a fiber optic transmitter adapted to transmit a second encoded data signal on the basis of an input signal; and (g) select means, coupled between said encoder circuit, PWD correction means and fiber optic transmitter, for selectively providing one of either said PWD-corrected signal or said transmit data signal XD as said input signal to said transmitter.

11. A data interchange network, comprising:

(a) a plurality of nodes or drops each of which is capable of receiving, re-transmitting and originally transmitting encoded data signals via fiber optic cable; and (b) a plurality of cables interconnecting said nodes or drops;

(c) wherein each of said nodes or drops comprises:

(1) receiver means for receiving a first encoded data signal and providing an output signal (RX);

(2) clock recovery means, coupled to said receiver means, for recovering a clock signal (RC) from said output signal;

(3) data decoder means, coupled to said receiver means and said clock recovery means, for providing a received data signal (RD) on the basis of said output signal RX and said clock signal RC, said received data signal RD indicative of data encoded in said encoded data signal;

(4) pulse width distortion (PWD) correction means, coupled to said receiver means, for at least partially correcting for any pulse width distortion in said output signal RX and providing a PWD-corrected signal;

(5) encoder means for providing a transmit data signal (XD) on the basis of data to be transmitted (TD) and an externally generated transmit data clock signal (XC);

(6) transmitter means for transmitting a second encoded data signal on the basis of an input signal; and (7) select means, coupled between said encoder means, PWD correction means and transmitter means, for selectively providing one of either said PWD-corrected signal or said transmit data signal XD as said input signal to said transmitter means.

12. A data interchange network as recited in claim 11, wherein said cables are fiber optic cables, said receiver means comprises a fiber optic receiver and said transmitter means comprises a fiber optic transmitter.

13. A data interchange network as recited in claim 11, wherein said select means comprises a first tristate-with-enable buffer having an input terminal coupled to an output terminal of said PWD correction means, an output terminal coupled to an input terminal of said transmitter means, and an enable terminal;

an invertor having an output terminal coupled to the enable terminal of said first tristate-with-enable buffer and an input terminal adapted to receive an externally generated request to send signal; and a second tristate-with-enable buffer having an input terminal adapted to receive the transmit data signal XD, an output terminal coupled to the input terminal of said transmitter means, and an enable terminal adapted to receive said request to send signal.

14. A data interchange network as recited in claim 12, wherein said data decoder means comprises:

a first flip-flop having a data input terminal (D1) coupled to the receiver means, a clock input terminal (CLK1) coupled to the clock recovery means and an output terminal (Q1);

a second flip-flop having a data input terminal (D2) coupled to the output terminal Q1 of the first flip-flop, a clock input terminal (CLK2) coupled to the clock recovery means and an output terminal (Q2); and an exclusive OR (EXOR) gate having first and second input terminals coupled to the respective output terminals Q1, Q2 of the first and second flip-flops and an output terminal, wherein the received data signal RD is provided via said output terminal.

15. A data interchange network as recited in claim 14, wherein said clock recovery means comprises:

a third flip-flop having a data input terminal (D3) coupled to the receiver means, a clock input terminal (CLK3) adapted to receive an externally generated clock signal X16 and an output terminal (Q3):

a fourth flip-flop having a data input terminal (D4) coupled to the output terminal Q3 of the third flip-flop, a clock input terminal (CLK4) adapted to receive the clock signal X16 and an output terminal (Q4);

an inverted exclusive OR (inverted EXOR) gate having first and second input terminals coupled to the respective output terminals Q3, Q4 of the third and fourth flip-flops and an output terminal; and divider means, coupled to the output terminal of the inverted EXOR gate and the respective clock input terminals CLK3, CLK4 of the third and fourth flip-flops, for providing the clock signal RC on the basis of the clock signal X16 and an output of the inverted EXOR gate.

16. A data interchange network as recited in claim 15, wherein said encoder means comprises a Nonreturn to Zero Differential (NRZD) encoder.

17. A data interchange network as recited in claim 15, wherein said encoder means comprises a Biphase-mark encoder.

18. A data interchange network as recited in claim 16, wherein said NRZD encoder comprises:

a fifth flip-flop having a data input terminal (D5) adapted to accept said data to be transmitted TD, a clock input terminal (CLK5) adapted to accept said transmit data clock signal XC and an output terminal (Q5);

a second exclusive OR (EXOR) gate having a first input terminal coupled to the output terminal Q5 of the fifth flip-flop, a second input terminal and an output terminal; and a sixth flip-flop having a data input terminal (D6) coupled to the output terminal of the second EXOR gate, a clock input terminal (CLK6) adapted to accept the transmit data clock signal XC and an output terminal (Q6) coupled to the second input terminal of the second EXOR gate.

19. A method of exchanging data in a network comprising a plurality of nodes or drops and a plurality of cables interconnecting said nodes or drops, the method comprising the steps of:

(a) transmitting a first encoded optical data signal from a first node;

(b) receiving said first encoded optical data signal at a second node and providing at said second node an electrical output signal (RX) based upon said first encoded optical data signal;

(c) recovering a clock signal (RC) from said electrical output signal RX;

(d) providing a received data signal (RD), on the basis of said electrical output signal RX and said clock signal RC, indicative of data encoded in said encoded optical data signal;

(e) at least partially correcting for any pulse width distortion (PWD) in said electrical output signal RX and providing a PWD-corrected signal;

(f) generating a transmit data signal (XD) on the basis of data to be transmitted (TD) and an externally generated transmit data clock signal (XC);

(g) selecting one of either said PWD-corrected signal or said transmit data signal XD; and (h) transmitting, from said second node to a third node, a second encoded optical data signal based upon the selected signal.

* * * * *